Oct. 20, 1936.  J. C. BRYANT  2,057,658
SHOCK ABSORBING TRAILER CONNECTION
Filed May 5, 1936
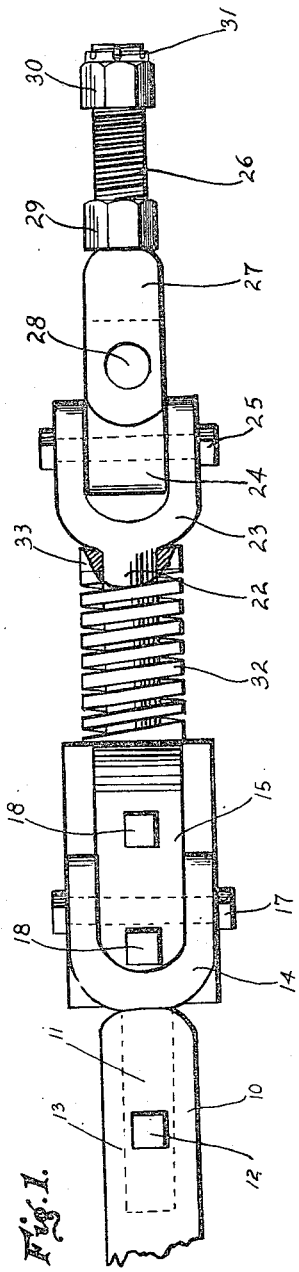
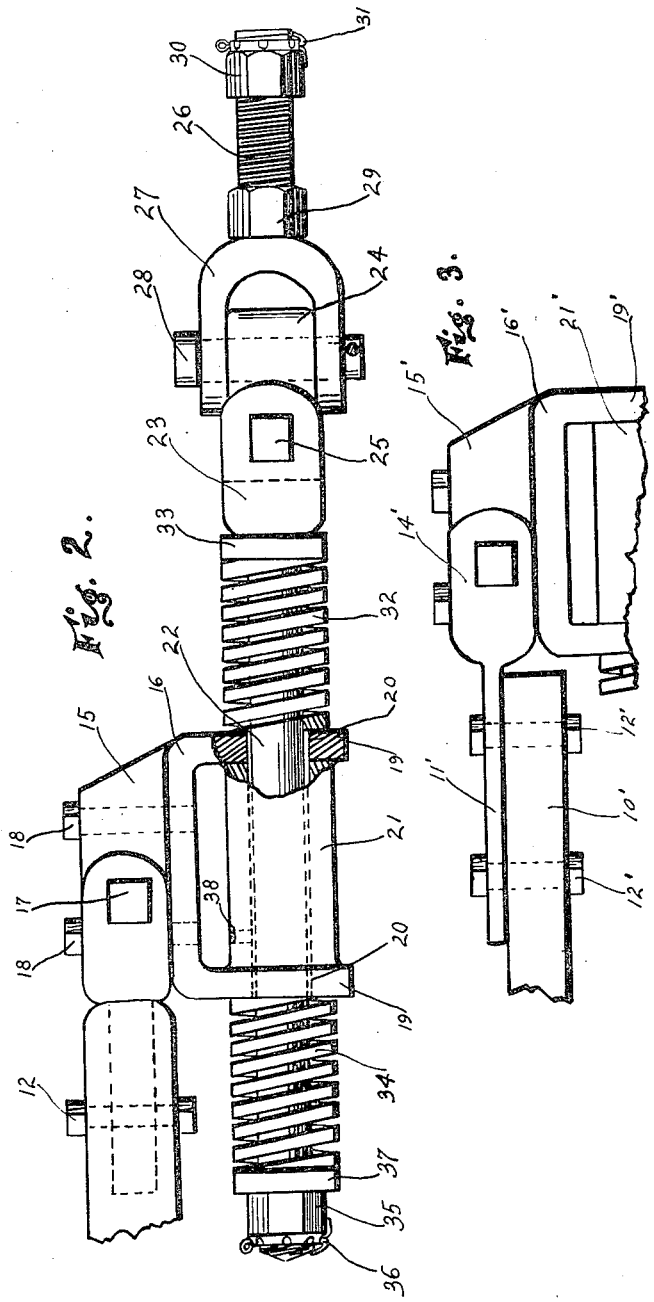
INVENTOR
*Jesse C. Bryant*
BY
*Watson E. Coleman.*
ATTORNEY Patented Oct. 20, 1936

2,057,658

UNITED STATES PATENT OFFICE 2,057,658

SHOCK ABSORBING TRAILER CONNECTION

Jesse Collon Bryant, Little Rock, Ark.

Application May 5, 1936, Serial No. 78,037

1 Claim. (Cl. 280—33.9)

This invention relates to a shock absorbing connection between a trailer and a vehicle.

An object of this invention is to provide a trailer hitch or connection by means of which a trailer may be secured to a vehicle in a manner whereby the trailer may have substantially universal movement with respect to the vehicle so that the turning movement of the vehicle will not put any undue strain on the trailer or the connection therebetween.

Another object of this invention is to provide a coupling of this character which is exceedingly simple in construction and which will cushion the trailer in either forward or reverse movement.

The above and various other objects and advantages of this invention will in part be described in, and in part be understood from the following detail description of the present preferred embodiment, the same being illustrated in the accompanying drawing, wherein:—

Figure 1 is a detail top plan of a shock absorbing connection constructed according to an embodiment of this invention.

Figure 2 is a detail side elevation of the connection partly broken away and in section.

Figure 3 is a fragmentary side elevation of a modified form of this connection.

Referring to the drawing wherein like symbols designate corresponding parts throughout the several views, the numeral 10 designates generally a draw bar which is adapted to be connected to a trailer of suitable construction.

A rod or bar 11 is mounted in a suitable opening 13 provided in the forward end of the draw bar 10 and is secured by means of a bolt or fastening device 12 passing through the tongue or draw bar 10 and the bar 11. A U-shaped member 14 is carried by the forward end of the bar 11 and the parallel arms of this member 14 engage on opposite sides of a block 15 which is secured to the top of a U-shaped guide member 16. The U-shaped member 14 is pivotally secured to the block 15 by means of a bolt or pivotal connection 17. The U-shaped guide member 16 may be secured to the block 15 by means of bolts 18 or other suitable fastening devices.

The parallel arms 19 of the U-shaped member 16 are provided with alined openings 20 therethrough and a sleeve or tubular member 21 is disposed between the parallel arms 19 and secured as by welding or the like in a manner whereby the bore of a sleeve 21 will aline with the openings 20 in the arms 19. A slidable bar 22 loosely engages through the sleeve 21 and is provided at its forward end with a fork or bifurcated member 23, which may be formed integral with the bar 22. The opposed arms of the bifurcated member 23 engage on opposite sides of a block 24, being pivotally secured to the block 24 by means of a pivotal member 25 in the form of a bolt or headed pin. A forward bar 26 having a forked or bifurcated rear end portion 27 is secured to the block 24 by means of a pivotal connection 28 with the pivot 28 disposed at a right angle to the pivot 25. Preferably, the bar 26 is threaded substantially throughout the entire length thereof and a nut 29 is threaded onto the bar 26 and is adapted to engage on one side, preferable the rear side of a vehicle bumper or other suitable attaching means, and a second nut 30 is also threaded onto the threaded portion 26 and is locked in adjusted position by means of a cotter pin 31, or the like, extending through the bar 26.

Movement of the sliding bar 22 in one direction is cushioned by means of a spring 32 which is interposed between the forward arm 19 of the U-shaped member 16 and the bifurcated member 23. Preferably, a washer 33 is interposed between the forward end of the spring 32 and the forked member 23.

Movement of the bar 22 in the opposite direction is cushioned by means of the spring 34, which is interposed between the rear arm 19 of the U-shaped member 16 and a nut 35 which is threaded onto the rear end of the slide bar 22. The nut 35 is locked in adjusted position by means of a cotter pin 36 or the like. A washer 37 is interposed between the rear end of the spring 34 and the nut 35.

In Figure 3, there is disclosed a slightly modified form of this invention wherein the draw bar 10' is constructed out of wood or the like and in this form, the bar 11' is preferably flat and is secured to one side or face of the draw bar 10' by means of bolts or fastening devices 12'. The remainder of the connection shown in Figure 3 is identical with the balance of the structure shown in Figures 1 and 2, and it is, therefore, thought that a further description of this form is unnecessary.

In the use of this trailer connection, the bar 11 is adapted to be fixedly secured to the draw bar or tongue 10 and it will be understood that the U-shaped member 16 may be disposed in dependent relation, as shown in Figure 2, or may be disposed in upstanding position, depending only upon the type of trailer to which the connection is secured and upon the height of the bumper or part to which the draw bar 26 is secured. The bar 26 is fastened by means of the nuts 29 and 30 to a suitable hole in either a bumper or other part fixed to the rear of the vehicle.

The rear spring 34 may be tensioned by adjusting the nut 35 and this tensioning nut 35 will also tension the forward cushioning spring 32. The spring 34 will take up the strain during the pulling of the trailer by the vehicle and the spring 32 will take up any strain or shocks caused by rearward movement of the draw bar or slide member 22. The universal connection comprising the forked members 23 and 27 and the block 24 will permit lateral movement of the vehicle with respect to the trailer and also up and down movement of these two members with respect to each other. The bearing or sleeve 21 may be lubricated through a hole 38 which communicates with the bore of the sleeve 21.

I claim:

A connection as set forth comprising a bar, means for securing the bar to a trailer draw bar, a fork on the forward end of the bar, a block between the arms of the fork, a horizontally disposed pivot extending through the fork and the block, a U-shaped guide member secured to the under side of the block and provided with guide openings in the parallel arms thereof, a sleeve fixedly secured between the arms of the guide member and having the bore thereof alining with the openings in the arms of the guide member, an elongated rod slidable through the sleeve and the openings of the guide member, cushioning springs on opposite sides of the guide member and engaging about the rod, threaded tensioning means for the springs, a threaded attaching rod disposed forwardly of said first rod, a universal connection between the attaching rod and said slide rod, a pair of nuts mounted on said attaching rod whereby to secure said rod to a vehicle.

JESSE COLLON BRYANT.